US006597360B1

(12) United States Patent
Stamm et al.

(10) Patent No.: US 6,597,360 B1
(45) Date of Patent: Jul. 22, 2003

(54) AUTOMATIC OPTIMIZATION OF THE POSITION OF STEMS OF TEXT CHARACTERS

(75) Inventors: Beat Stamm, Redmond, WA (US); Gregory C. Hitchcock, Woodinville, WA (US); Claude Betrisey, Redmond, WA (US); Matt Conway, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/546,139

(22) Filed: Apr. 10, 2000

Related U.S. Application Data

(63) Continuation-in-part of application No. 09/168,015, filed on Oct. 7, 1998.

(51) Int. Cl.[7] .................................................. G09G 9/36
(52) U.S. Cl. ........................ 345/469; 345/467; 345/468; 345/469.1; 345/472
(58) Field of Search ............................... 345/467, 468, 345/469, 470, 613, 469.1, 472

(56) References Cited

U.S. PATENT DOCUMENTS

| 4,136,359 A | 1/1979 | Wozniak ................ 358/17 |
| 4,217,604 A | 8/1980 | Wozniak ................ 358/16 |
| 4,278,972 A | 7/1981 | Wozniak ................ 340/703 |
| 5,057,739 A | 10/1991 | Shimada et al. ........ 313/477 R |
| 5,122,783 A | 6/1992 | Bassetti, Jr. ................ 340/701 |
| 5,254,982 A | 10/1993 | Feigenblatt et al. ........ 345/148 |
| 5,298,915 A | 3/1994 | Bassetti, Jr. et al. ........ 345/149 |
| 5,325,479 A * | 6/1994 | Kaasila ................ 345/469 |

(List continued on next page.)

FOREIGN PATENT DOCUMENTS

| EP | 0 673 012 A2 | 9/1995 | ............ G09G/3/36 |
| WO | WO 00/21037 | 4/2000 | ............ G06T/11/00 |
| WO | WO 00/67247 | 11/2000 | ............ G09G/5/22 |

OTHER PUBLICATIONS

Abram, G. et al. "Efficient Alias–free Rendering using Bit–masks and Look–Up Tables" *San Francisco*, vol. 19, No. 3, 1985 (pp. 53–59).

(List continued on next page.)

*Primary Examiner*—Jeffery Brier
*Assistant Examiner*—Daniel J Chung
(74) *Attorney, Agent, or Firm*—Workman, Nydegger & Seeley

(57) ABSTRACT

The present invention provides for automatic placement of typographical features such as vertical stems or horizontal segments of a character on high contrast pixel sub-component boundaries as part of a rendering process that uses separately controllable pixel sub-components of pixels to represent different portions of the character. In order to identify the typographical features of the character that are to be aligned with high contrast pixel sub-component boundaries, topology of the character is analyzed at runtime. In display devices having vertical stripes of same-colored pixel sub-components, it has been found that character legibility is increased when the left edges of stems are aligned with high contrast boundaries between pixel sub-components. Processing time and resources are conserved by performing a partial, rather than a full, topological analysis of the character. For example, some font files include data structures that define the position of key control points associated with the character, thereby indicating where the stems or other typographical features are located, and the relationship between different typographical features.

46 Claims, 8 Drawing Sheets

IMAGE DATA HINTED TO A HIGH CONTRAST SUB-PIXEL BOUNDARY

U.S. PATENT DOCUMENTS

| | | | |
|---|---|---|---|
| 5,334,996 A | 8/1994 | Tanigaki et al. | 345/152 |
| 5,341,153 A | 8/1994 | Benzschawel et al. | 345/152 |
| 5,349,451 A | 9/1994 | Dethardt | 358/518 |
| 5,450,208 A | 9/1995 | Murata | 358/296 |
| 5,467,102 A | 11/1995 | Kuno et al. | 345/1 |
| 5,543,819 A | 8/1996 | Farwell et al. | 345/150 |
| 5,548,305 A | 8/1996 | Rupel | 345/150 |
| 5,555,360 A | 9/1996 | Kumazaki et al. | 395/143 |
| 5,633,654 A | 5/1997 | Kennedy, Jr. et al. | 345/114 |
| 5,684,510 A * | 11/1997 | Brassell et al. | 345/443 |
| 5,689,283 A | 11/1997 | Shirochi | 345/132 |
| 5,767,837 A | 6/1998 | Hara | 345/152 |
| 5,821,913 A | 10/1998 | Mamiya | 345/88 |
| 5,847,698 A | 12/1998 | Reavey et al. | 345/173 |
| 5,857,067 A * | 1/1999 | Hassett et al. | 345/442 |
| 5,859,648 A * | 1/1999 | Moore et al. | 345/471 |
| 5,894,300 A | 4/1999 | Takizawa | 345/115 |
| 5,909,221 A * | 6/1999 | Nakai et al. | 345/467 |
| 5,949,643 A | 9/1999 | Batio | 361/681 |
| 5,963,185 A | 10/1999 | Havel | 345/83 |
| 5,982,387 A * | 11/1999 | Hellmann | 345/467 |
| 6,157,390 A * | 12/2000 | Cheng | 345/467 |
| 6,175,372 B1 * | 1/2001 | Ballard et al. | 345/441 |
| 6,249,908 B1 * | 6/2001 | Stamm | 345/467 |

OTHER PUBLICATIONS

Ahumada, A.J. et al. "43.1: A Simple Vision Model for Inhomogeneous Image–Quality Assessment" *1998 SID*.

Barbier, B. "25.1: Multi–Scale Filtering for Image Quality on LCD Matrix Displays" *SID 96 Digest*.

Barten, P.G.J. "P–8: Effect of Gamma on Subjective Image Quality" *SID 96 Digest*.

Beck. D.R. "Motion Dithering for Increasing Perceived Image Quality for Low–Resolution Displays" *1998 SID*.

Bedford–Roberts, J. et al. "10.4: Testing the Value of Gray–Scaling for Images of Handwriting" *SID 95 Digest*, pp. 125–128.

Chen, L.M. et al. "Visual Resolution Limits for Color Matrix Displays" *Displays—Technology and Applications*, vol. 13, No. 4, 1992, pp. 179–186.

Cordonnier, V. "Antialiasing Characters by Pattern Recognition" *Proceedings of the S.I.D.* vol. 30, No. 1, 1989, pp. 23–28.

Cowan, W. "Chapter 27, Displays for Vision Research" *Handbook of Optics, Fundamentals, Techniques & Design*, Second Edition, vol. 1, pp. 27.1–27.44.

Crow, F.C. "The Use of Grey Scale for Improved Raster Display of Vectors and Characters" *Computer Graphics*, vol. 12, No. 3, Aug. 1978, pp. 1–5.

Feigenblatt, R.I., "Full–color Imaging on amplitude–quantized color mosaic displays" *Digital Image Processing Applications SPIE* vol. 1075 (1989) pp. 199–205.

Gille, J. et al. "Grayscale/Resolution Tradeoff for Text: Model Predictions" *Final Report*, Oct. 1992–Mar. 1995.

Gould, J.D. et al. "Reading From CRT Displays Can Be as Fast as Reading From Paper" *Human Factors*, vol. 29 No. 5, pp. 497–517, Oct. 1987.

Gupta, S. et al. "Anti–Aliasing Characters Displayed by Text Terminals" *IBM Technical Disclosure Bulletin*, May 1983 pp. 6434–6436.

Hara, Z. et al. "Picture Quality of Different Pixel Arrangements for Large–Sized Matrix Displays" *Electronics and Communications in Japan*, Part 2, vol. 77, No. 7, 1974, pp. 105–120.

Kajiya, J. et al. "Filtering High Quality Text For Display on Raster Scan Devices" *Computer Graphics*, vol. 15, No. 3, Aug. 1981, pp. 7–15.

Kato, Y. et al. "13:2 A Fourier Analysis of CRT Displays Considering the Mask Structure, Beam Spot Size, and Scan Pattern" (c) *1998 SID*.

Krantz, J. et al. "Color Matrix Display Image Quality: The Effects of Luminance and Spatial Sampling" *SID 90 Digest*, pp. 29–32.

Kubala, K. et al. "27:4: Investigation Into Variable Addressability Image Sensors and Display Systems" *1998 SID*.

Mitchell, D.P. "Generating Antialiased Images at Low Sampling Densities" *Computer Graphics*, vol. 21, No. 4, Jul. 1987, pp. 65–69.

Mitchell, D.P. et al., "Reconstruction Filters in Computer Graphics", *Computer Graphics*, vol. 22, No. 4, Aug. 1988, pp. 221–228.

Morris R.A., et al. "Legibility of Condensed Perceptually–tuned Grayscale Fonts" *Electronic Publishing, Artistic Imaging, and Digital Typography*, Seventh International Conference on Electronic Publishing, Mar. 30–Apr. 3, 1998, pp. 281–293.

Murch, G. et al. "7.1: Resolution and Addressability: How Much is Enough?" *SID 85 Digest*, pp. 101–103.

Naiman, A., "Some New Ingredients for the Cookbook Approach to Anti–Aliased Text" *Proceedings Graphics Interface 81*, Ottawa, Ontario, May 28–Jun. 1, 1984, pp. 99–108.

Naiman, A, et al. "Rectangular Convolution for Fast Filtering of Characters" *Computer Graphics*, vol. 21, No. 4, Jul. 1987, pp. 233–242.

Naiman, A.C. "10:1 The Visibility of Higher–Level Jags" *SID 95 Digest* pp. 113–116.

Peli, E. "35.4: Luminance and Spatial–Frequency Interaction in the Perception of Contrast", *SID 96 Digest*.

Pringle, A., "Aspects of Quality in the Design and Production of Text", *Association of Computer Machinery* 1979, pp. 63–70.

Rohellec, J. Le et al. "35.2: LCD Legibility Under Different Lighting Conditions as a Function of Character Size and Contrast" *SID 96 Digest*.

Schmandt, C. "Soft Typography Information Processing 80", *Proceedings of the IFIP Congress* 1980, pp. 1027–1031.

Sheedy, J.E. et al. "Reading Performance and Visual Comfort with Scale to Grey Compared with Black–and–White Scanned Print" *Displays*, vol. 15, No. 1, 1994, pp. 27–30.

Sluyterman, A.A.S. "13:3 A Theoretical Analysis and Empirical Evaluation of the Effects of CRT Mask Structure on Character Readability" (c) *1998 SID*.

Tung. C., "Resolution Enhancement Technology in Hewlett–Packard LaserJet Printers" *Proceedings of the SPIE—The International Society for Optical Engineering*, vol. 1912, pp. 440–448.

Warnock, J.E. "The Display of Characters Using Gray Level Sample Arrays", *Association of Computer Machinery*, 1980, pp. 302–307.

Whitted, T. "Anti–Aliased Line Drawing Using Brush Extrusion" *Computer Graphics*, vol. 17, No. 3, Jul. 1983, pp. 151,156.

Yu, S., et al. "43:3 How Fill Factor Affects Display Image Quality" (c) *1998 SID*.

"Cutting Edge Display Technology—The Diamond Vision Difference" www.amasis.com/diamondvision/technical.html, Jan. 12, 1999.

"Exploring the Effect of Layout on Reading from Screen" http://fontweb/internal/repository/research/explore.asp?RES=ultra, 10 pages, Jun. 3, 1998.

"How Does Hinting Help?" http://www.microsoft.com/typography/hinting/how.htm/fname=%20&fsize, Jun. 30, 1997.

"Legibility on screen: A report on research into line length, document height and number of columns" http://fontweb/internal/repository/research/scrnlegi.asp?RES=ultra Jun. 3, 1998.

"The Effect of Line Length and Method of Movement on reading from screen" http://fontweb/internal/repository/research/linelength.asp?RES=ultra, 20 pages, Jun. 3, 1998.

"The Legibility of Screen Formats: Are Three Columns Better Than One?" http://fontweb/internal/repository/research/scrnformat.asp?RES=ultra, 16 pages, Jun. 3, 1998.

"The Raster Tragedy at Low Resolution" http://www.microsoft.com/typography/tools/trtalr.htm?fname=%20&fsize.

"The True Type Rasterizer" http://www.microsoft.com/typography/what/raster.htm?fname=%20&fsize, Jun. 30, 1997.

"TrueType fundamentals" http://www.microsoft.com/OTSPEC/TTCHO1.htm?fname=%20&fsize= Nov. 16, 1997.

"True Type Hinting" http://www.microsoft.com/typography/hinting/hinting.htm Jun. 30, 1997.

"Typographic Research" http://fontweb/internal/repository/research/research2.asp?RES=ultra Jun. 3, 1998.

* cited by examiner

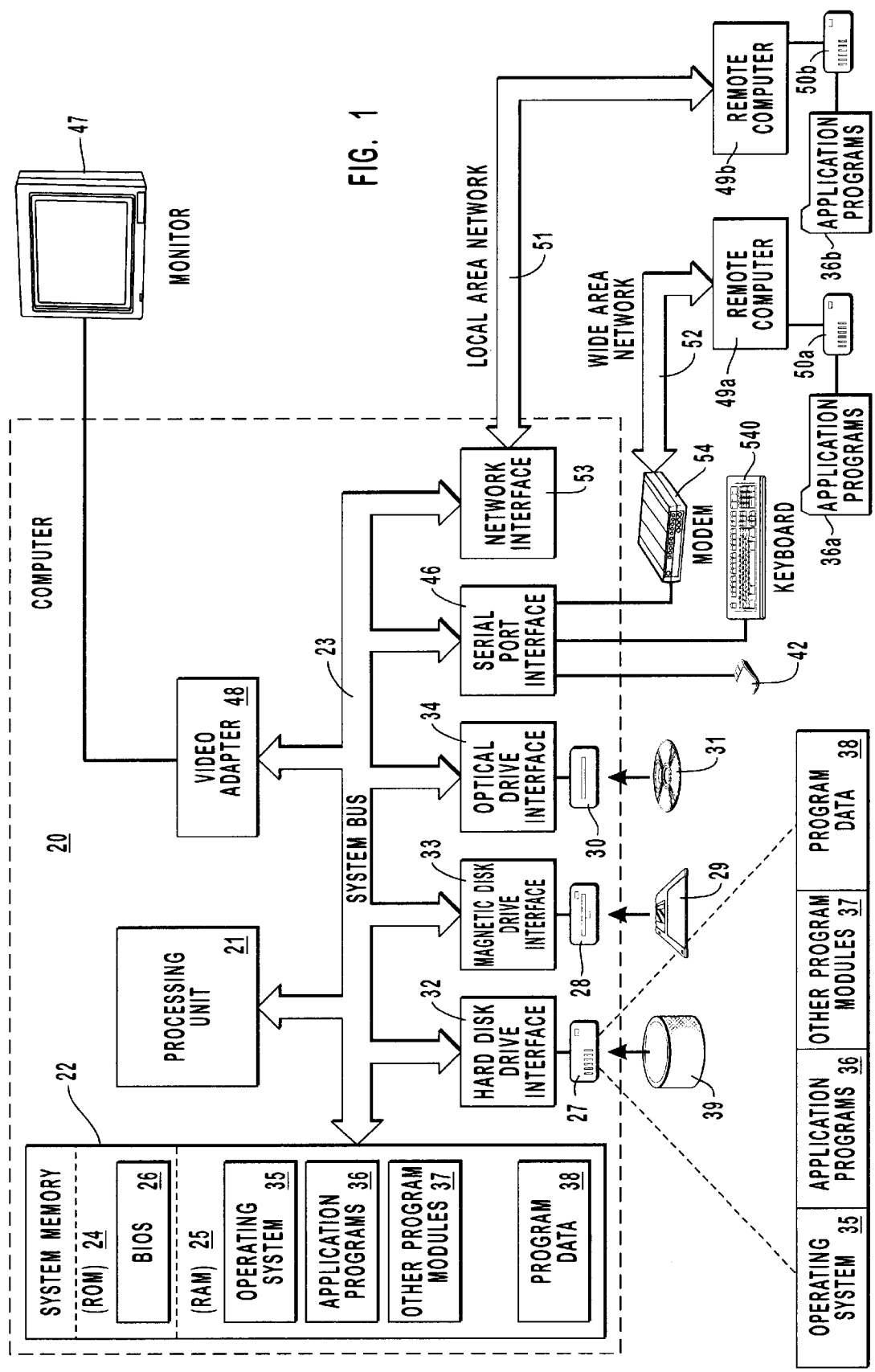

AUTOMATIC OPTIMIZATION OF THE POSITION OF STEMS OF TEXT CHARACTERS

RELATED APPLICATION

This is a continuation-in-part of U.S. patent application Ser. No. 09/168,015, filed Oct. 7, 1998, which is incorporated herein by reference.

BACKGROUND OF THE INVENTION

1. The Field of the Invention

The present invention relates to systems and methods for displaying images on a display device. More specifically, the present information relates to systems and methods for displaying text characters on a display device having separately controllable pixel sub-components, with selected edges of the characters being positioned at high contrast pixel sub-component boundaries.

2. The Prior State of the Art

A key aspect of many technologies, especially computers, is the requirement of visual interaction with an end user. In fact, the data and information displayed by many applications are especially designed to have a visually pleasing and aesthetic appearance. Word processors, for example, typically attempt to emulate an actual piece of paper by causing the screen to display a graphical a piece of paper. As the word processor creates a document, the text and images are placed on the graphic piece of paper as they will appear when physically rendered. The visual interaction of the end user with the display device is therefore an integral part of many technologies.

An important aspect of the visual interaction with an end user is the ability to display color. A typical display device has a screen that has a large number of pixels, and each pixel usually has red, green, and blue sub-pixels. Because the pixels are relatively small, the color discerned by the human eye is a blend of the red, green, and blue lights of each pixel. By varying the intensity of the red, green, and blue lights, a display device is potentially capable of displaying millions of different colors.

One common display device used to display color is a cathode ray tube (CRT) display device. The pixels of a CRT display are arranged in a particular geometry, with each pixel consisting of three phosphors that emit light when excited by a beam of electrons. For CRT display devices, the luminous intensity values assigned to the phosphors are calculated together and the three phosphors in a pixel are controlled together to generate at the pixel a color perceived by the user as having a selected hue, intensity and saturation.

Another common display device, which is typically used for portable computers, is a liquid crystal display (LCD). LCD displays are preferable to CRT displays in many instances primarily because LCD displays are usually smaller, weigh less, and consume less power than comparably sized CRT displays. In computers that rely on batteries for their power, this is a significant advantage. The technology of LCD displays enables them to rival CRT displays in terms of sharpness and resolution.

Several differences, however, exist between CRT and LCD displays. Pixels of LCD display devices, unlike those of CRT display devices, consist of a plurality of pixel sub-components (usually three) that are separately addressable and inherently separately controllable. In addition, the pixels in an LCD display are usually arranged to form horizontal or vertical stripes of same-colored pixel sub-components, whereas the geometry of a the phosphors in a pixel of a CRT display is frequently triangular. In most LCD display devices used with portable computers, the pixels sub-components are arranged vertically, which results in red, green, and blue vertical stripes of same-colored pixel sub-components. Other LCD display devices have pixel sub-components arranged to form red, green and blue horizontal stripes of same-colored pixel sub-components. Other geometries may be used, but vertical and horizontal arrangements are the most common.

The ability of an LCD display or other display to provide high resolution is dependent in part on the size and quantity of the pixels in the LCD display, and in many situations, the resolution of LCD displays is not sufficient to enable text characters to be smoothly drawn or rendered on the LCD display. The limited resolution of the LCD display may have a significant visual impact on the user as the text or image data is rendered on an LCD or other display.

Text characters or fonts, in particular, present unique problems. Technology permits a font to be stored on a computer with high resolution and when a high resolution character is rendered on a low resolution or coarse display device, the character is fitted to the pixel grid of the display device. This results in a loss of information relating to the characters and frequently compromises the shape of the characters, which is contrary to the intent of the typographer.

More specifically, when a character is rendered to a low resolution display device or pixel grid, certain parts of the character as it is stored electronically may not fall exactly on the pixel boundaries As a result, the shape of the character is forcibly changed to conform with pixel boundaries in the pixel grid. The ultimate effect on the character is that the character may be displaced in a certain direction or the stems, serifs, and other features of the character may be somewhat thicker or thinner than originally designed by the typographer.

Conventional text rendering processes that result in text characters being displayed on display devices were originally designed to conform to the CRT model of pixels having three phosphors that are controlled together to display a single color and to represent a single portion of the image. With the advent of large numbers of portable personal computers, existing text rendering processes designed for CRT display devices were simply directly applied to LCD display devices. Such conventional text rendering process, when applied to LCD display devices, use each pixel to represent a single portion of the image, and do not take advantage of the separately addressable nature of the pixel sub-components.

In view of the foregoing, there is a need in the art for techniques for rendering text on LCD display devices that can improve the resolution of the text. It would be desirable to provide systems and methods that could enhance the readability of text and reduce the character distortion that has previously resulted from edges of characters being repositioned to boundaries of full pixels of LCD display devices.

SUMMARY OF THE INVENTION

The present invention relates to systems and methods of rendering text and other images on LCD display devices or other display devices having pixels with separately controllable pixel sub-components. According to the invention, individual pixel sub-components represent different portions of a text character or another image, rather than the entire pixel representing a single portion. This is accomplished by mapping spatially different sets of one or more samples of the image data to individual pixel sub-components. Because the pixel sub-components are separately addressable and controllable, the LCD display device operated according to the invention renders images with improved resolution compared to the resolution generated by conventional rendering processes.

While the principles of the invention can be used to render any image, the invention is described herein primarily in the context of text characters. As part of the invention, character data is hinted, or fitted to a grid, such that selected edges of the character fall on high contrast boundaries between pixel sub-components, thereby further improving the appearance and readability of the text. Thus, not only are portions of the character displayed with sub-pixel resolution, but selected edges of the character are also positioned to reduce the color fringing errors or effects that would otherwise be experienced.

The hinting process of the invention involves analyzing the topology of the outline of the character at runtime to identify edges of the character that are to be repositioned to high contract boundaries between pixel sub-components. While the invention extends to a direct and full analysis of the topology of the character, it is often more computationally efficient to analyze portions of the character definition in a font file to identify control points on the character that are to be fitted to the high contrast boundaries and distances between the control points.

Additional advantages of the invention will be set forth in the description which follows, and in part will be obvious from the description, or may be learned by the practice of the invention. The advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 1 illustrates an exemplary system that provides a suitable operating environment for the present invention;

DETAILED DESCRIPTION OF THE PREFERRED EMBODIMENTS

Figure 2A:
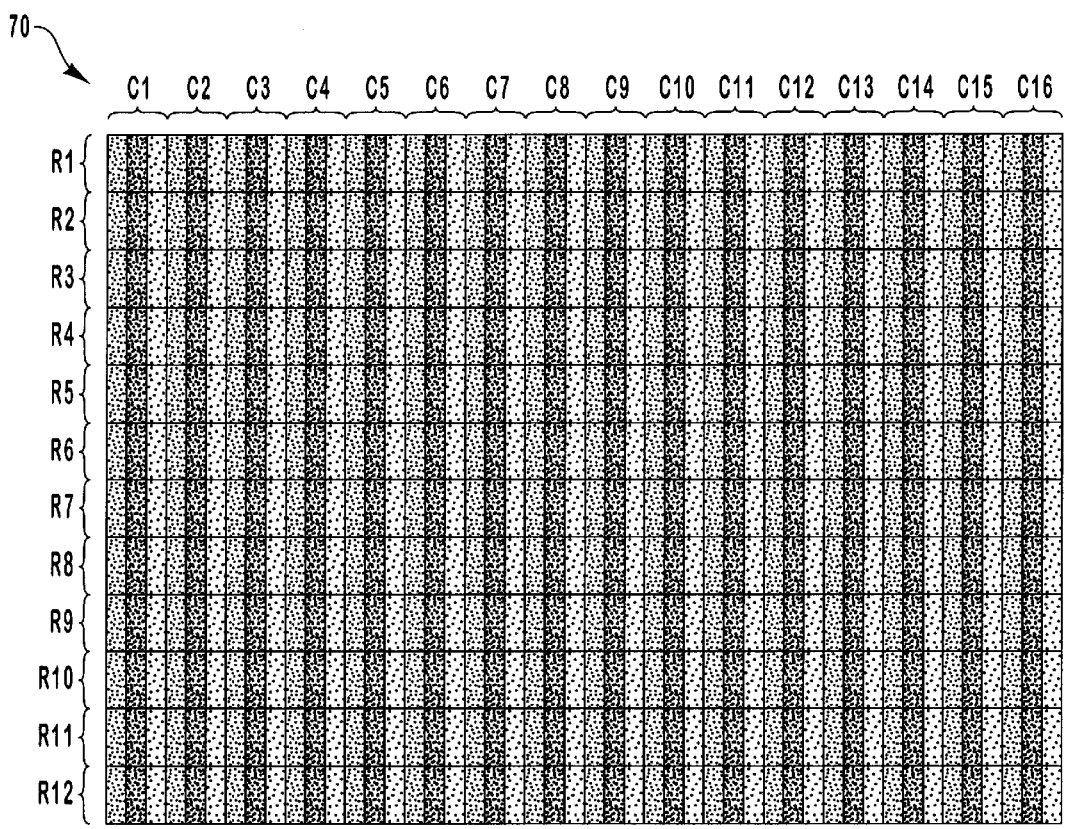
FIGS. 2a and 2b depict a portion of an LCD display and show the separately controllable pixel sub-components of the pixels of the LCD display.

One of the major problems associated with displaying information such as text on the screen of a display device is that the display device has a coarse pixel grid having a resolution that is much lower than the resolution of the information to be displayed. As a result of this discrepancy, the rendering or rasterization process usually distorts and compromises the information being displayed. In the case of text, the character shapes are altered such that they fit the pixel grid of the display device. The visual appearance and legibility of text or other information on a screen is addressed in part by the process of hinting or instructing, which addresses the legibility issues of color, readability, spacing, weight, alignment, symmetry, and actual bitmap shapes of each character by aligning the typographical features of the characters in a font along pixel or pixel sub-component boundaries.

In the case of black text on a white background and other combinations, color refers to the balance between the black and white on a screen. An even and consistent color results in more legible text. Color is affected by the contrast between thick and thin stem weights, the size of the spacing that is internal to the characters, the smoothness of a diagonal stroke and other factors. An even color is less distracting to a reader. Hinting improves the balance between white and black on the display device such that the displayed image approaches an even color.

Readability refers to the identifiability of a particular character. Character sets which are frequently referred to as fonts, typically contain a number of glyphs or characters which are represented by one or more outlines. At low resolutions and small font sizes, it is difficult to legibly represent a character and it is frequently necessary to alter the bitmap image that represents the glyph or character. Proper spacing also contributes to legibility especially at low resolutions. Improper spacing typically occurs because the outline of the character is typically rounded up or down in order to accommodate the low resolution pixel grid of a display device. Text data, however, is more legible if the space between characters and between words appears to be constant to the reader.

The weight of a character generally refers to the thickness of the character and the strokes of the character. For instance, a font that is bolded has a heavier weight than the same font that is not in bold type. Much of the difficulty with regard to weight occurs between uppercase and lowercase characters. Uneven weighting can result in uppercase characters drawing too much attention to themselves or to an inability to distinguish headings from text.

Alignment refers to the tallness or pixel height of characters. Characters should be kept aligned especially at small sizes where a difference in the pixel height is more noticeable, because text that is not properly aligned appears wavy and distracts the reader. The symmetry of a character is usually an issue with characters having diagonal strokes although symmetry is an issue with characters that have other types of strokes, including rounded curves. Controlling the symmetry can improve the appearance of individual characters and enhance the color of the text. In sum, hinting a font or character enhances the legibility and appearance of a font as described above.

The invention is described below by using diagrams to illustrate either the structure or processing of embodiments used to implement the systems and methods of the present invention. Using the diagrams in this manner to present the invention should not be construed as limiting of its scope. The present invention encompasses both methods and systems for automatically optimizing the placement of typographical features along high contrast boundaries.

I. Exemplary Computing and Hardware Environments

The embodiments of the present invention may comprise a special purpose or general purpose computer including various computer hardware, as discussed in greater detail below.

Embodiments within the scope of the present invention also include computer-readable media for carrying or having computer-executable instructions or data structures stored thereon. Such computer-readable media can be any available media which can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such a connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

FIG. 1 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 1, an exemplary system for implementing the invention includes a general purpose computing device in the form of a conventional computer 20, including a processing unit 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help transfer information between elements within the computer 20, such as during start-up, may be stored in ROM 24.

The computer 20 may also include a magnetic hard disk drive 27 for reading from and writing to a magnetic hard disk 39, a magnetic disk drive 28 for reading from or writing to a removable magnetic disk 29, and an optical disk drive 30 for reading from or writing to removable optical disk 31 such as a CD-ROM, CD-R, CD-RW or other optical media. The magnetic hard disk drive 27, magnetic disk drive 28, and optical disk drive 30 are connected to the system bus 23 by a hard disk drive interface 32, a magnetic disk drive-interface 33, and an optical drive interface 34, respectively. The drives and their associated computer-readable media provide nonvolatile storage of computer-executable instructions, data structures, program modules and other data for the computer 20. Although the exemplary environment described herein employs a magnetic hard disk 39, a removable magnetic disk 29 and a removable optical disk 31, other types of computer-readable media for storing data can be used, including magnetic cassettes, flash memory cards, digital video disks, Bernoulli cartridges, RAMs, ROMs, and the like.

Program code means comprising one or more program modules may be stored on the hard disk 39, magnetic disk 29, optical disk 31, ROM 24 or RAM 25, including an operating system 35, one or more application programs 36, other program modules 37, and program data 38. A user may enter commands and information into the computer 20 through keyboard 40, pointing device 42, or other input devices (not shown), such as a microphone, joy stick, game pad, satellite dish, scanner, or the like. These and other input devices are often connected to the processing unit 21 through a serial port interface 46 coupled to system bus 23. Alternatively, the input devices may be connected by other interfaces, such as a parallel port, a game port or a universal serial bus (USB). A monitor 47 or another display device is also connected to system bus 23 via an interface, such as video adapter 48. In addition to the monitor, personal computers typically include other peripheral output devices (not shown), such as speakers and printers.

The computer 20 may operate in a networked environment using logical connections to one or more remote computers, such as remote computers 49a and 49b. Remote computers 49a and 49b may each be another personal computer, a server, a router, a network PC, a peer device or other common network node, and typically includes many or all of the elements described above relative to the computer 20, although only memory storage devices 50a and 50b and their associated application programs 36a and 36b have been illustrated in FIG. 1. The logical connections depicted in FIG. 1 include a local area network (LAN) 51 and a wide area network (WAN) 52 that are presented here by way of example and not limitation. Such networking environments are commonplace in office-wide or enterprise-wide computer networks, intranets and the Internet.

When used in a LAN networking environment, the computer 20 is connected to the local network 51 through a network interface or adapter 53. When used in a WAN networking environment, the computer 20 may include a modem 54, a wireless link, or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing communications over wide area network 52 may be used.

Figure 2B:
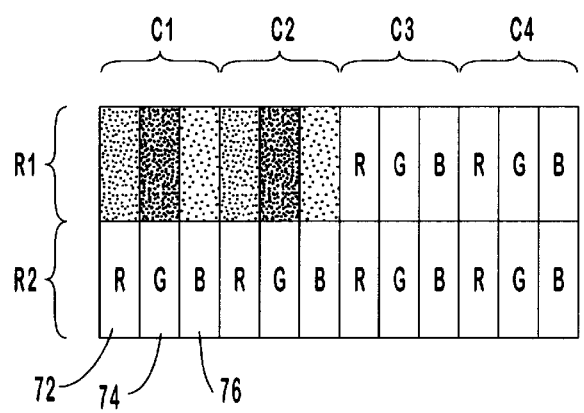

FIGS. 2a and 2b illustrate physical characteristics of an exemplary LCD display device that can be used to display characters processed using the hinting operations of the invention. The portion of LCD 70 depicted in FIG. 2a includes a plurality of rows R1–R12 and a plurality of columns C1–C16. Color LCDs utilize multiple distinctly addressable elements and sub-elements, herein referred to as pixels and pixel sub-components, respectively. FIG. 2b, which illustrates in greater detail the upper left hand portion of LCD 70, demonstrates the relationship between the pixels and pixel sub-components.

Each pixel includes three pixel sub-components, illustrated, respectively, as red (R) sub-component 72, green (G) sub-component 74 and blue (B) sub-component 76. The pixel sub-components are non-square and are arranged on LCD 70 to form vertical stripes of same-colored pixel sub-components. The RGB stripes normally run the entire width or height of the display in one direction. Common LCD display devices currently used with most portable computers are wider than they are tall, and tend to have RGB stripes running in the vertical direction, as illustrated by LCD 70. Examples of such devices that are wider than they are tall have column-to-row ratios such as 640×480, 800× 600, or 1024×768. LCD display devices are also manufactured with pixel sub-components arranged in other patterns, including horizontal stripes of same-colored pixel sub-components, zigzag patterns or delta patterns. Moreover, some LCD display devices have pixels with a plurality of pixel sub-components other than three pixel sub-components. The present invention can be used with any such LCD display device or flat panel display device so long as the pixels of the display device have separately controllable pixel sub-components.

A set of RGB pixel sub-components constitutes a pixel. Thus, as used herein, the term "pixel sub-component" refers to one of the plurality of separately controllable elements that are included in a pixel. Referring to FIG. 2b, the set of pixel sub-components 72, 74, and 76 forms a single pixel. In other words, the intersection of a row and column, such as the intersection of row R2 and column C1, represents one pixel, namely (R2, C1). Moreover, each pixel sub-component 72, 74 and 76 is one-third, or approximately one-third, the width of a pixel while being equal, or approximately equal, in height to the height of a pixel. Thus, the three pixel sub-components 72, 74 and 76 combine to form a single substantially square pixel. This pixel/sub-component relationship can be utilized for rendering text images on a display device, as will be further explained below.

II. Hinting and Other Image Processing Operations

Figure 3:
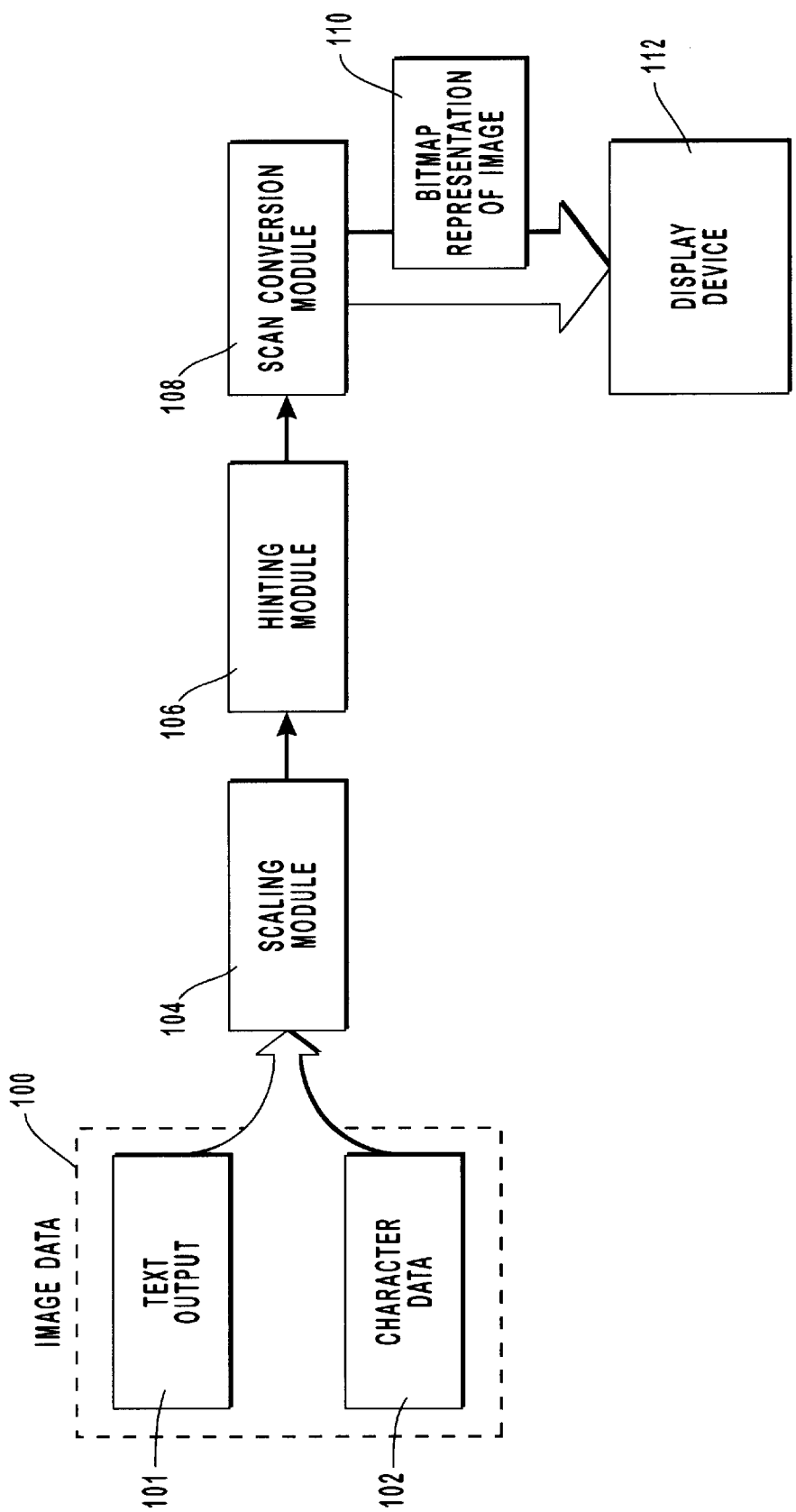
FIG. 3 is a block diagram illustrating the process of rendering or rasterizing image data on a display device.

FIG. 3 is a block diagram illustrating the rasterization process or the process of rendering text on a display device. The rendering process of FIG. 3 is capable of displaying characters on LCD display devices with sub-pixel precision. In other words, the dimensions of the features of the characters, particularly in the direction perpendicular to the striping of the display device, are not limited to being integer multiples of the corresponding dimension of the full pixels. Instead, each separately controllable pixel sub-component of the pixels represents a different portion of the displayed character.

As part of the rendering process, embodiments of the methods of the invention include a step for hinting the image data such that a typographical feature (e.g., a stem) is adjusted to a position on a grid corresponding to a high contrast boundary between pixel sub-components. The grid, as is further described below, has grid locations defined by the pixels and pixel sub-components of the display device. The step for hinting the image data, and the acts that correspond thereto, are described in greater detail below.

The process of FIG. 3 begins with text output 101, which may be provided by an application such as a word processor or can be an electronic data structure that represents a document. Character data 102 is typically located in a data store such as a font file and generally contains information describing a particular set of characters.

Character data 102 may contain, for example, the outline of each glyph in the character set. The outlines are mathematical descriptions of the shapes of the glyphs in the character set or font using lines and curves. Additionally, each outline has several control points which are needed to scale the glyph to the desired type size and resolution. Some of the control points are on-curve points and other points are off-curve points. To define a character edge, for example, one or more on-curve control points are chosen. Similarly, a pair of control points can delimit a character stem. The on-curve points are grid fitted in the hinting process and the off-curve points are placed using interpolation instructions. Also, the control points may be used to indicate certain dimensions and distances, such as stem width. In the hinting process, a touched point refers to a point that has been hinted or grid-fitted and an untouched point refers to a point that has not been hinted or grid-fitted. It is therefore possible for both touched and untouched points to refer to either on-curve points or off-curve points. The terms "on-curve" and "off-curve" refer to the geometry of the characters and the terms "touched" and "untouched" typically refer to the hinting or grid-fitting strategy.

Text output 101 and character data 102 together represent image data 100, which is received by scaling module 104. Scaling module 104 scales image data 100 such that subsequent processing operations may take advantage of the higher resolution that can be achieved using pixel sub-components. Because a pixel grid may have, for example, either horizontal striping or vertical striping, the scaling is typically performed at a greater rate in the direction that is perpendicular to the grid striping. Examples of scaling operations that can be used in conjunction with the hinting operations of the invention are described in greater detail in U.S. patent application Ser. No. 09/168,013, filed Oct. 7, 1998, entitled "Methods and Apparatus for Resolving Edges within a Display Pixel," which is incorporated herein by reference.

After image data 100 has been scaled, it is hinted or grid fitted by hinting module 106. Hinting module 106 functions in part to preserve, as much as possible, the regularity of character locations and distances, preserve the character proportions and to control the digitized appearance. In many instances, however, the pixel grid of the display device has low resolution, in comparison to the high resolution of the character, and it is necessary to make certain trade-offs. For example, it is difficult to have both the right and left edges of a character stem in the correct place and maintain the proper stem weight or thickness.

In general, hinting module 106 aligns the characters along pixel sub-component boundaries, regardless of whether the pixel sub-component boundaries are also boundaries between full pixels. This is performed by changing or distorting the glyph outline to ensure that the correct pixels and pixel sub-components are turned on or off when the glyph is rasterized. Once a glyph is grid-fitted, the control points, which are typically numbered, will not be changed, but the coordinates of those control points may have shifted.

Scan conversion module 108 is the process of converting the scaled and hinted character into a bitmap image. Because the characters or text data may be hinted to pixel sub-component boundaries, each pixel sub-component can be separately mapped. This allows a character at be rendered with higher resolution. Scan conversion module 108 determines which pixel sub-component should be turned on and which pixel sub-components should be turned off. Scan conversion module 108 produces bitmap image 110 which is displayed on display device 112. The systems and methods of the present invention are described herein with reference to a display device having vertical striping, but can be applied to display devices having pixels arranged in other geometries, including but not limited to, horizontal striping. Examples of scan conversion operations that can be used with the hinting operations of the invention are disclosed in greater detail in U.S. patent application Ser. No. 09/168,014, filed Oct. 7, 1998, entitled "Methods and Apparatus for Performing Image Rendering and Rasterization Operations," which is incorporated herein by reference.

The scan conversion operations can result in a single sample being mapped to each of the pixel sub-components of a pixel. Alternatively, any number of samples can be mapped to the pixel sub-components. In general, spatially different sets of one or more samples are mapped to each pixel sub-component. The process of mapping sets of samples to pixel sub-components can be understood as a filtering process. The filters correspond to the position and number of samples included in the sets of samples mapped to the individual pixel sub-components. Filters corresponding to different colors of pixel sub-components can have the same size or different sizes. The samples included in the filters can be mutually exclusive (e.g., each samples is passed through only one filter) or the filters can overlap (e.g., some samples are included in more than one filter). In general, the filters used in the scan conversion process can be adapted to produce desirable color effects on the displayed images.

Figure 4A:
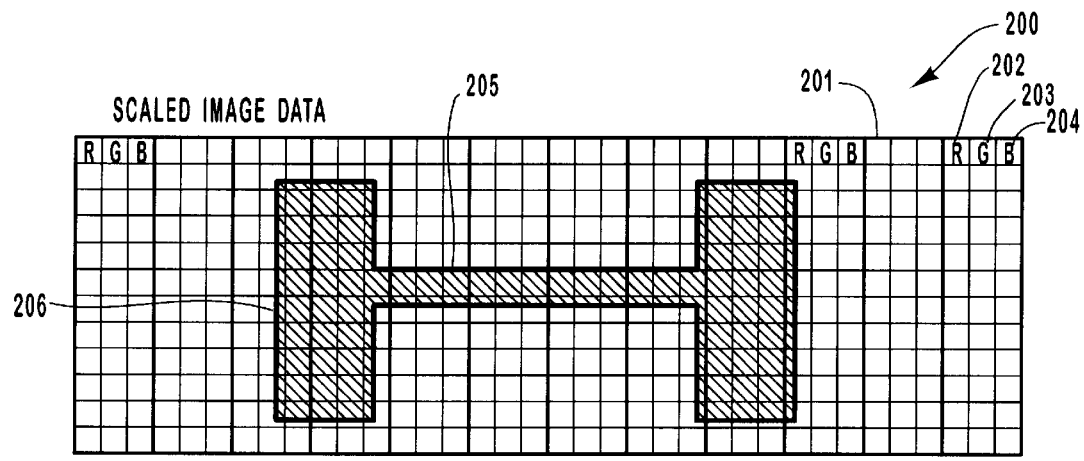
FIG. 4a is an illustration of a character before it is positioned on pixel boundaries.

FIG. 4a illustrates pixel grid 200 that represents the position of pixels on an LCD display device. Image data representing a text character 205 has been scaled by a factor of three in the direction perpendicular to the stripes of the display device and by a factor of one in the direction parallel to the stripes. The scaling is conducted so as to prepare the text character for the scan conversion process in which samples are mapped to individual pixel sub-components. Grid 200 is a computational tool used in the rendering process to adjust selected edges of the character to high contrast boundaries between pixel sub-components.

Pixel grid 200 corresponds to a plurality of pixels 201 of the LCD display device (e.g., display device 70 of FIG. 2a), with and each pixel 201 having a red pixel sub-component 202, a blue pixel sub-component 203, and a green pixel sub-component 204. As is often the case in the image rendering process, the outline of character 205 does not coincide with a pixel sub-component boundary. For instance, edge 206 does not coincide with a pixel sub-component boundary. Because character 205 does not match up with pixels 201 and the pixel sub-components 202, 203, and 204, the shape and placement of character 205 may be altered or grid-fitted during the rasterization process.

Figure 4B:
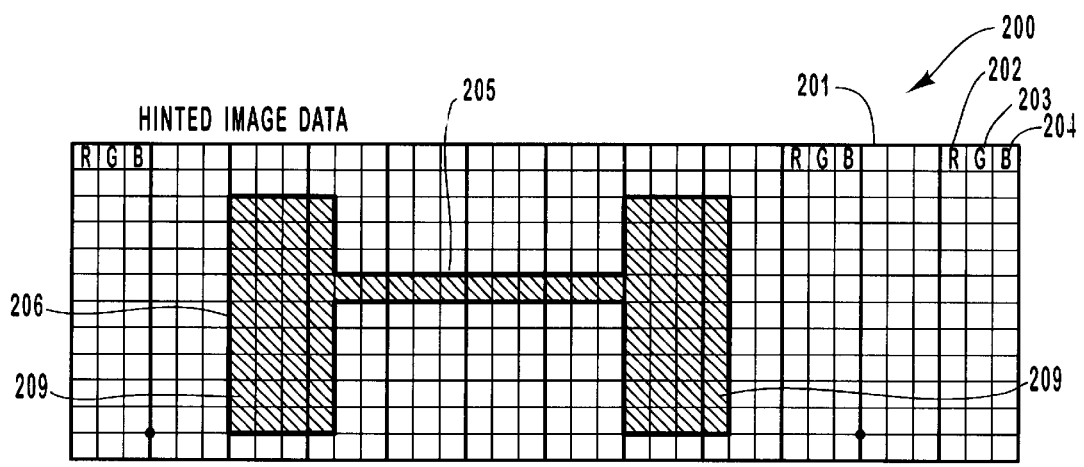
FIG. 4b is an illustration of the character after it has been positioned on pixel boundaries.

FIG. 4b illustrates character 205 after it has been grid fitted to pixel grid 200. As illustrated, character 205 has been physically moved down and to the left and stems 209 have been slightly narrowed during the rasterization process. This rounding effect, as illustrated in FIG. 4b, occurred at pixel boundaries.

Figure 4C:
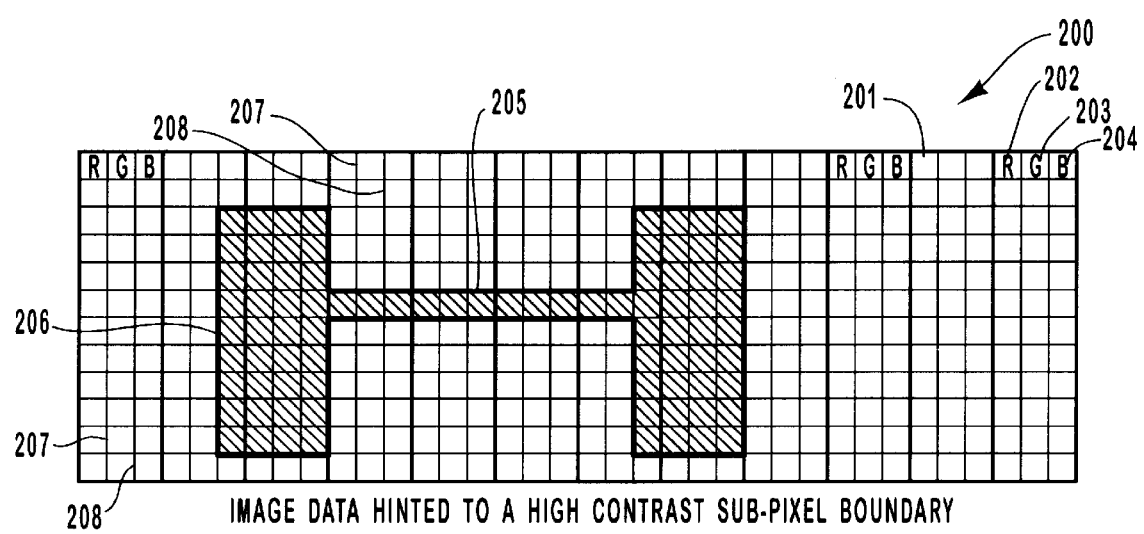
FIG. 4c is an illustration of the character after is has been phase adjusted and the stems have been aligned on high contrast pixel sub-component boundaries.

FIG. 4c illustrates character 205 after it has been grid fitted to pixel sub component boundaries. Character edge 206 has been snapped to boundary 208 between a green pixel sub-component and a blue pixel sub-component. Boundary 208 is preferred to boundary 207 between red and green pixel sub-components because boundary 208 has a higher contrast, although the invention can also extend to snapping character edges to boundaries between adjacent red and green pixel sub-components. The ability of the present invention to grid fit character 205 to pixel sub-component boundaries provides extra precision in the rendering process. In addition to fitting characters to pixel sub-component boundaries, the selection of high contrast boundaries have been found to improve the readability of the displayed characters. It has also been found that aligning the left edge of stems (e.g., edge 206) is often more important in yielding highly readable characters than aligning other portions of the character with high contrast boundaries.

The invention extends to any process whereby selected edges of characters are repositioned to high contrast pixel sub-component boundaries during the hinting operation. A direct and full analysis of the topology of a character at runtime is one way of identifying the features of the character that should be repositioned according to the invention. While this type of full topological analysis can be used, it is often computationally inefficient or impractical to do so. Accordingly, any available technique for making only a partial topological analysis at runtime can be used, thereby reducing computational time and resources.

Many character sets or fonts have font definitions or other information that lend themselves to being used to make an partial analysis of the topology of the characters during runtime, sufficiently so that selected edges or portions of the characters can be repositioned to high contrast pixel sub-component boundaries during the hinting operation. Such font information that can be used for this purpose includes any information that defines the position and spacing of certain typographical features, such as character edges and stem widths.

While the invention can be used with substantially any type of font, a specific example of performing a partial topological analysis of a character outline during runtime will be presented in the context of TrueType fonts. TrueType font files include control value tables (CVTs). The CVT is a table that is derived from information encoded in files, including True Type font files, that lists the color of distances as well as dimensions for various letter features, such as stem widths. The CVT allows a font designer to refer to particular distances by name rather than as an abstract distance. The width of a character stem, for example, may be referred to as the Vertical Stem Thickness. As used herein, the control value table is intended to be representative of information associated with characters that describes certain distances and dimensions of the character. Frequently, the distances and dimensions are described in terms of key control points on the outline of the character.

One feature of CVTs that can conveniently used to describe the topology of text characters is the description of certain distances in a character by color. A horizontal distance of a character, as described in a CVT, can be a black distance, a white distance, or a grey distance. Black distances describe distances that are interior to a letterform (e.g., the width of a stem), white distances describe distances that correspond to regions generally outside the body of the character (e.g., left and right-side bearings, spaces between stems, the open counter of "O", etc.), and grey distances describe distances that include a white and a black distance.

Figure 5A:
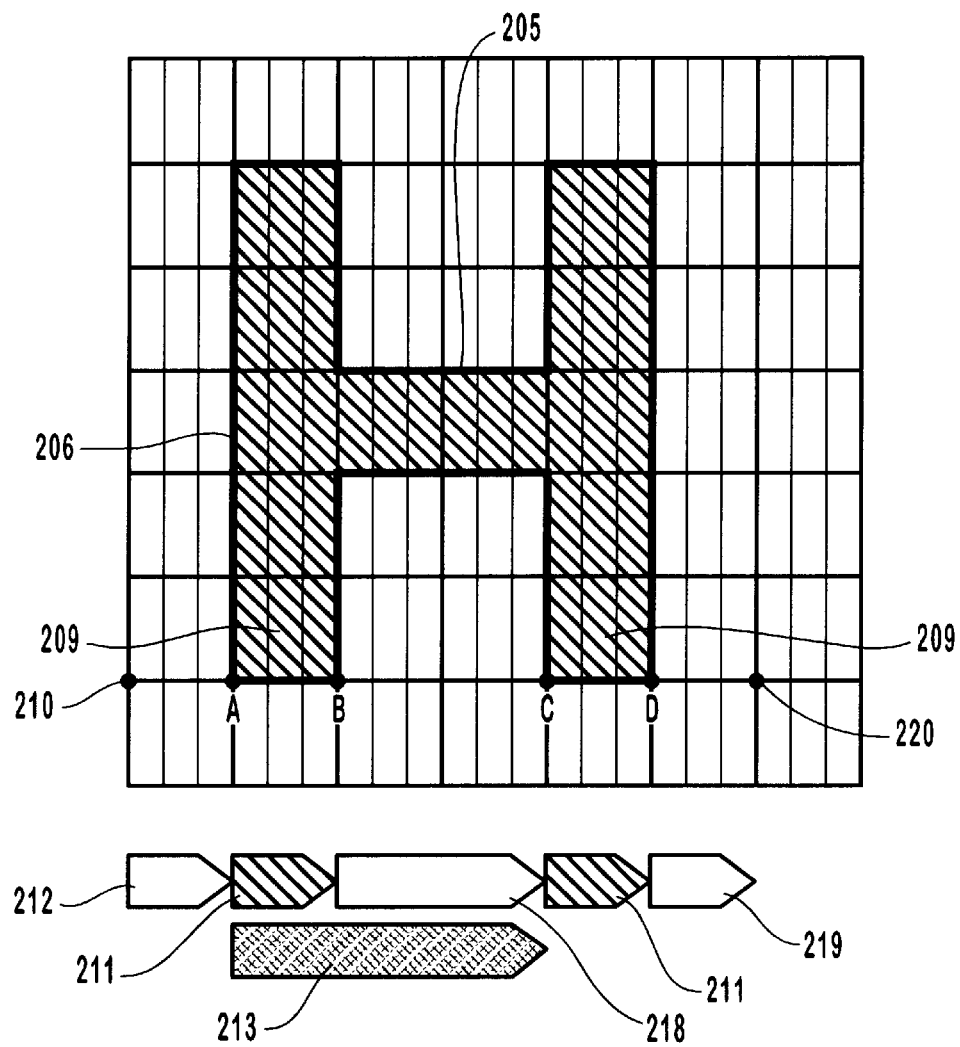
FIG. 5a is an illustration of the distances and dimensions associated with a character.

FIG. 5a illustrates these distances with reference to character 205. Character 205 has two stems 209. The first stem begins at point A and ends at point B and the second stem begins at point C and ends at point D. The distances from point A to point B and from point C to point D are black distances because they are interior to the letterform or outline of character 205 and are indicated by black arrows 211. The horizontal distance from left-side bearing point 210 to point A is a white distance because the distance is exterior to the letterform of character 205 and is indicated by white arrow 212. Similarly, the horizontal distance 219 between point D and right-side bearing point 220 is a white distance. Distance 218 is also designated as a white distance, since it is a distance between stems 209 of character 205. The distance from point A to point C, shown by grey arrow 213, is a grey distance because the distance includes the black distance 211 from point A to point B and the white distance 218 from point B to point C.

Figure 5B:
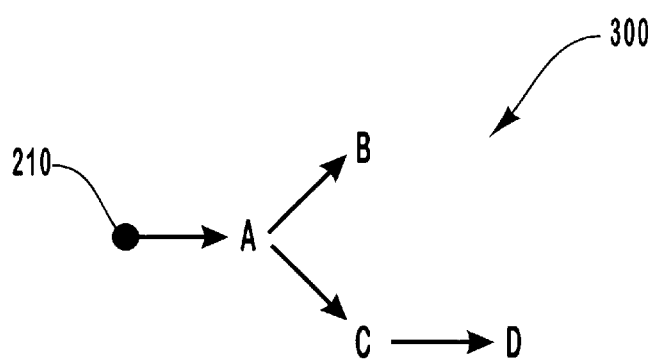
FIG. 5b is an illustration of a directed acyclic graph used to represent the distances associated with a character.

The black, white, and grey distances are relative to each other and can be illustrated as having a parent/child hierarchy in a directed acyclic graph (DAG) as illustrated in FIG. 5b. Thus, point A is reckoned from left-side bearing point 210 and is also the child of left-side bearing point 210. In turn, point A is the parent of points B and C and points B and C are the children of point A. The inherent structure of widths and distances that are associated with a letterform allow for relevant typographical features to be identified at runtime, even if the distances and dimensions are not conveniently located in a control value table.

Figure 6:
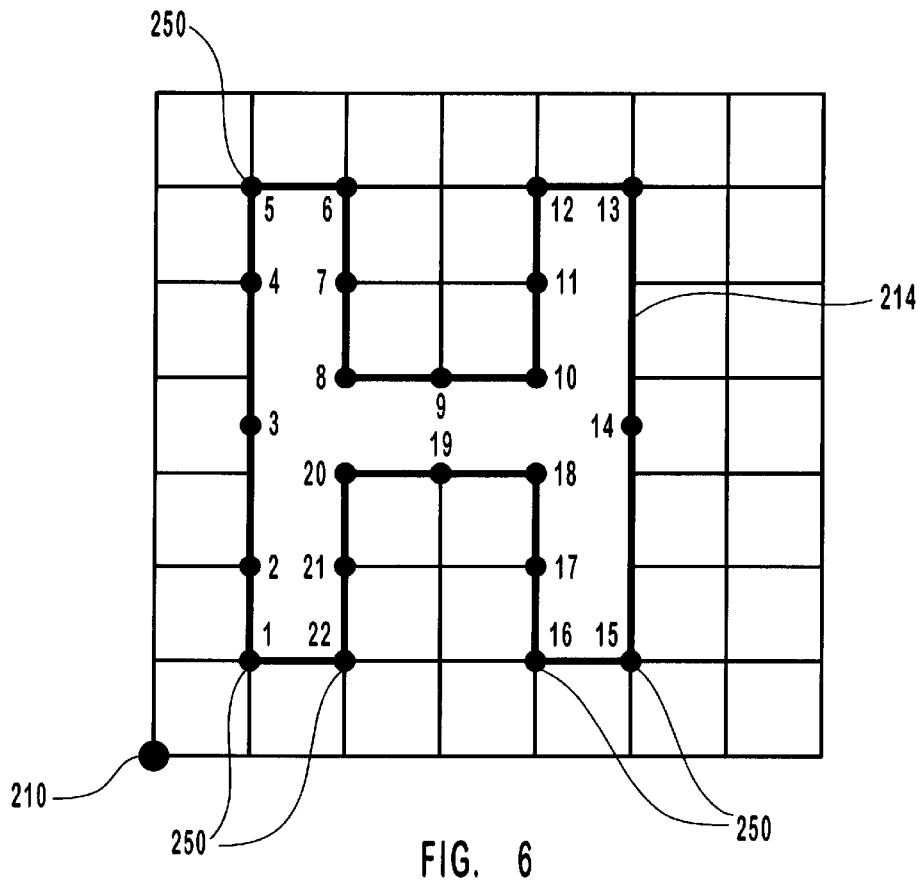
FIG. 6 is an illustration of the outline and control points that define a character.

Before describing the present invention further, a brief description of a glyph is presented. FIG. 6 is a block diagram illustrating the outline and control points of a glyph. Outline 214 is defined by a series of control points 250, some of which may be on-curve and some of which may be off-curve. If two successive control points are on-curve, they define a straight line. Control points are numbered consecutively, in this example, and if the curve is followed in the direction of increasing point numbers, the filled area will always be to the right of the control point. Key control points which define the black distance of the stem width are points 1 and points 22 in FIG. 6.

Figure 7:
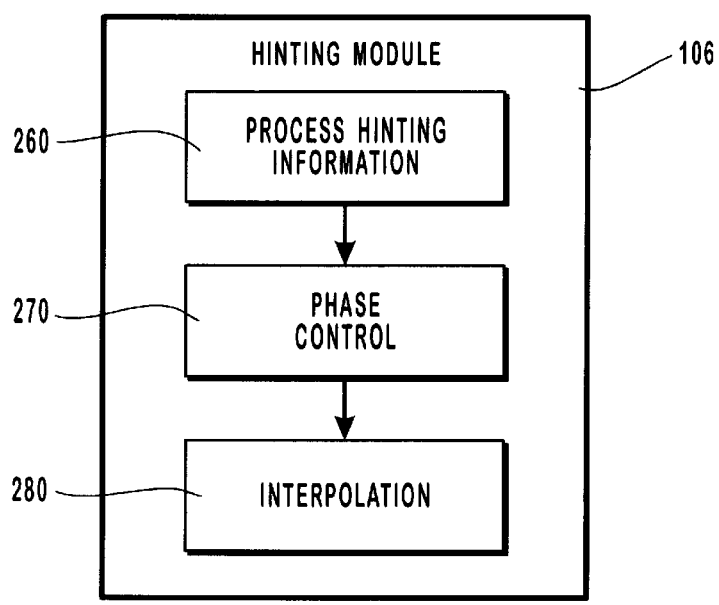
FIG. 7 is a block diagram of the hinting process.

FIG. 7 is a block diagram providing more detail to hinting module 106, previously discussed with reference to FIG. 3. Hinting module 106 can be considered to perform the step for hinting the image data such that a typographical feature (e.g., a stem) is adjusted to a position on a grid corresponding to a high contrast boundary between pixel sub-components. FIG. 7 illustrates examples of acts that correspond to the step for hinting as is further explained below.

Hinting module 106 receives image data after it has been scaled and then functions to grid fit the character to grid points defined by pixels and pixel sub-components. In step 260, hinting module 106 processes the hinting instructions that are provided by the typographer and moves certain key control points to the appropriate grid points such that the letterform is visually pleasing and legible. In act 260, some parts or control points of the character are moved and other parts and control points are left untouched. According to one embodiment of the invention, the act of grid fitting the image data as represented by act 260 is one example of a portion of the step for hinting the image data.

Phase control 270 involves moving the hinted points from act 260 onto pixel sub-component boundaries of high contrast. Frequently, the hinted points moved in phase control 270 define the left edge of a character stem. According to the embodiment of the invention illustrated at FIG. 7, the act of phase adjusting the typographical feature such that the typographical feature coincides with a location of the grid that represents a high contrast boundary between pixel sub-components as represented by act 270 is one example of a portion of the step for hinting the image data.

Once the appropriate control points, such as those that define the left edge of the stems of a character, are positioned at high contrast boundaries between pixel sub-components, the other control points of the scaled image data are adjusted as needed. For example, the right edges of the stems can be repositioned on the grid such that the stems are given widths having values that may not be integer multiples of the width of entire pixels of the display device. In act 280, any points or segments of the outline that were not moved during act 260 and phase control 270 are now moved to new locations on the pixel grid using interpolation. Thus, in this embodiment, the act of interpolating remaining control points is one example of a portion of the step for hinting the image data.

Using the acts illustrated in FIG. 7, the hinting process results in selected edges of the character being aligned with high contrast pixel sub-component boundaries, while allowing the character to have dimensions in the direction perpendicular to the striping of the display device having sub-pixel values or, in other words, values that are not necessarily integer multiples of the corresponding dimension of the full pixels.

Figure 8:
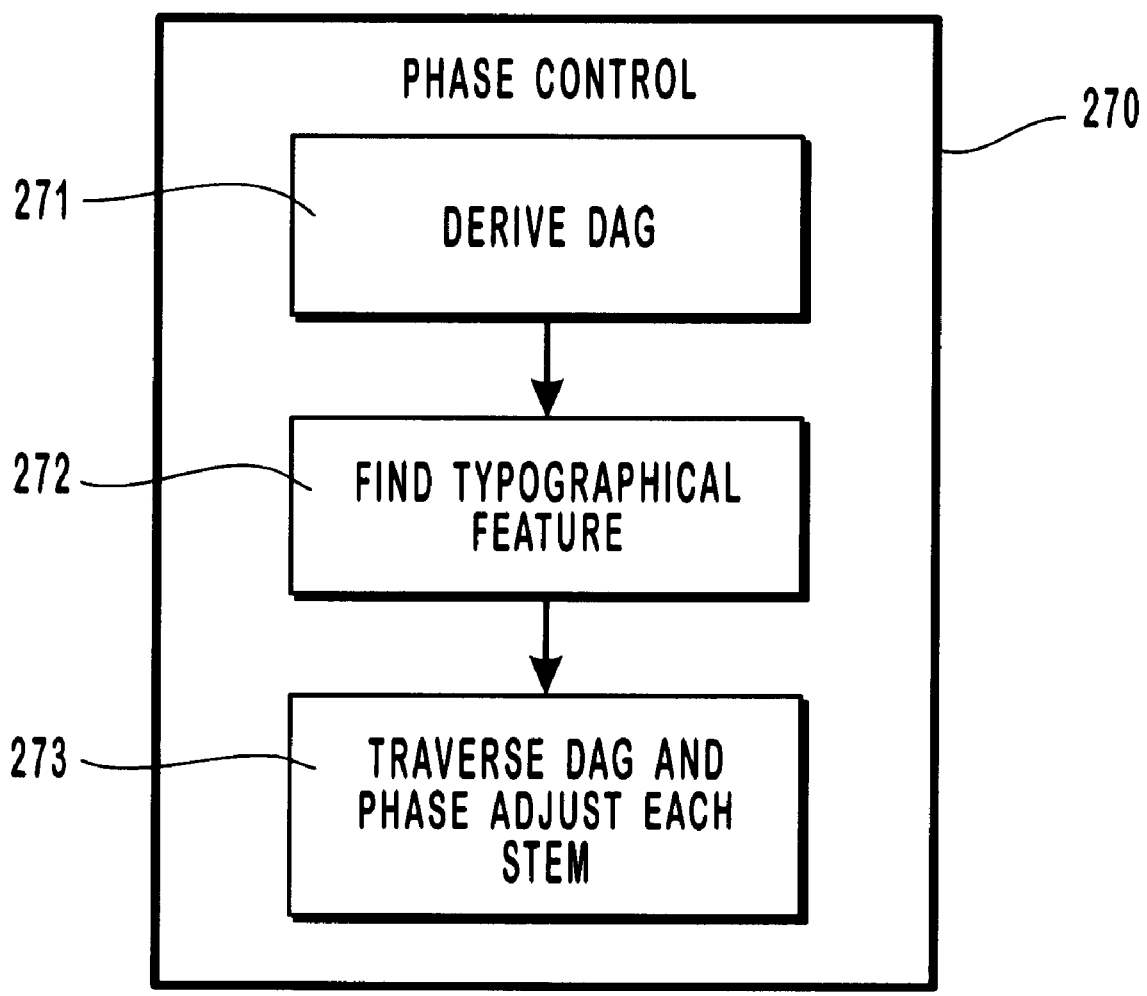
FIG. 8 is a more detailed block diagram illustrating the method of phase adjusting a character.

FIG. 8 is a detailed block diagram of the phase control implemented by hinting module 106 of FIG. 7 according to one embodiment of the invention, and further illustrates the acts that correspond to at least a portion of the step for hinting the image data according to one embodiment of the invention. As mentioned previously, the invention can be practiced using any process that fully or partially analyzes the topology of the glyph at runtime. FIG. 8 relates to the use of a directed acyclic graph, such as that associated with FIG. 5a and FIG. 5b. In step 271, the DAG of character 205 is derived from the interpretation of the hinting instructions which utilize the CVT and is illustrated in FIG. 5b.

In step 272, phase control 270 looks for distinctive typographical features. For example, phase control 270 may attempt to locate the vertical stems of a character by searching for alternating patterns of black and white horizontal distances if the pixel grid has vertical striping. If the pixel grid has horizontal striping, phase control 270 may attempt to locate horizontal line segments in the character by searching for alternating patterns of black and white vertical distances. In general, step 272 searches for particular typographical features, including but not limited to stems or horizontal segments. This is accomplished at runtime because the distances and dimensions of the characters are available in the CVT table.

For example, stems 209 of character 205 in FIG. 5a are inferred by determining that the black distances represented by arrows 211 alternate with the white distances from left-side bearing point 210 to point A and from point B to point C. It is also possible to use the grey distance indicated by arrow 213 instead of the white distance from point B to point C to infer the presence of a vertical stem.

In step 273, the DAG is traversed such that the stems may by phase adjusted or positioned on a high contrast pixel sub-component boundary. The first node of DAG 300 in FIG. 5b that indicates a stem is point A. The stem is moved such that the left edge of the stem falls on a high contrast boundary, such as the boundary between the green and blue pixel sub-components. Thus, the green pixel sub-component is exterior to the letterform and the blue pixel sub-component is interior to the letterform. In a similar manner, the other stems of a character are also hinted to a high contrast boundary.

One consideration that often arises when performing the hinting operations of the invention is adjusting for the potential error that the hinting process may introduce. As adjustments to the positions of the interdependent nodes are made as the DAG is traversed, the resulting placement of the right side bearing point of a character may become displaced. This error may also have an effect on the overall width of the character being rendered. However, the contrast of the character is improved. Thus, improved contrast may result in characters having erroneous overall widths, which may include a displaced right side bearing point.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a computer system having a display device, the display device having a plurality of pixels each having a plurality of pixel sub-components of different colors, a method of adjusting image data to a grid defined by the pixels and pixel sub-components in preparation for rasterizing an image on the display device, the method comprising the steps for:

obtaining image data having selected control points with positions relative to the grid, the positions of at least one of the selected control points of the obtained image data not coinciding with a boundary between pixel sub-components;

hinting the image data such that a typographical feature defined by one or more of the selected control points is adjusted to a position on the grid that corresponds to a selected boundary between pixel sub-components, the selected boundary being designated as a high contrast boundary due to the color contrast of the sub-pixel components which define the boundary, and which may comprise a boundary other than one which is between pixels; and displaying the image on the display device using the image data, the typographical feature being displayed at the high contrast boundary.

2. A method as defined in claim 1, wherein the image data represents a character, the method further comprising the step for analyzing the topology of the character at runtime to identify the typographical feature that is to be adjusted.

3. A method as defined in claim 1, wherein the step of displaying the image is conducted such that individual pixel sub-components of the pixels represent spatially different portions of the image data rather than the different portions being represented by entire pixels that include the individual pixel sub-components.

4. A method as defined in claim 1, wherein the typographical feature is a stem of a character represented by the image data.

5. A method as defined in claim 4, wherein the step for hinting the image data is conducted such that a left edge of the stem is aligned with the high contrast boundary.

6. A method as defined in claim 1, wherein the typographical feature is a horizontal segment of a character represented by the image data.

7. A method as defined in claim 1, wherein the step for hinting the image data comprising the acts of:

grid fitting the image data to grid points of the grid that corresponds to the pixels and pixel sub-components of the display device such that the one or more control points defined the typographical feature of the image data correspond to the grid points;

phase adjusting the typographical feature such that the typographical feature coincides with the high contrast boundary; and interpolating the image data such that the position on the grid of remaining control points of the image data is adjusted.

8. A method as defined in claim 7, wherein the typographical feature is one or more vertical stems of a character.

9. A method as defined in claim 7, wherein the typographical feature is one or more horizontal segments of a character.

10. A method as defined in claim 7, wherein the image data represents a character to be displayed on the display device, the method further comprising analyzing the topology of the character at runtime to identify the typographical feature.

11. A method as defined in claim 7, wherein the act of phase adjusting further comprises the acts of:

analyzing hinting instructions associated with the image data for patterns that are indicative of the typographical feature;

deriving, from the hinting instructions, a directed acyclic graph, wherein the topology of the typographical feature is at least partially defined by one or more nodes of the directed acyclic graph; and based on a traversal of the directed acyclic graph, identifying the position of the typographical feature and repositioning the typographical feature to the high contrast boundary.

12. A method as recited in claim 11, further comprising the acts of:

traversing the directed acyclic graph; and encountering a node that corresponds to a point of the image data that is to be repositioned on the grid; and accounting for an error introduced by a repositioning of a point corresponding to a previous node of the directed acyclic graph.

13. A method as defined in claim 11, wherein the act of analyzing the hinting instructions further comprises the act of searching for a selected pattern of distances having specified colors associated with the typographical feature.

14. A method as defined in claim 13, wherein the selected pattern is a black distance surrounded by white distances.

15. A method as defined in claim 13, wherein the selected pattern is a black distance surrounded by grey distances.

16. A method as defined in claim 13, wherein the selected pattern is a black distance surrounded by distances that are not black.

17. A method as defined in claim 7, wherein the high contrast boundary is between a blue pixel sub-component and a green pixel sub-component, the blue pixel sub-component being interior to a character defined by the image data and the green pixel sub-component being exterior to the character.

18. A method as defined in claim 7, wherein the high contrast boundary is between a red pixel sub-component and a green pixel sub-component, the red pixel sub-component being exterior to a character defined by the image data and the green pixel sub-component being interior to the character.

19. A method as defined in claim 7, further comprising the act of mapping spatially different sets of one or more samples of the image data to individual pixel sub-components of the pixels rather than mapping samples to entire pixels.

20. A method as recited in claim 1, the image data being associated with a character, wherein the step for hinting the image data comprising the acts of:
    analyzing the image data associated with the character, the image data defining:
        an outline of the character using at least the one or more control points, distance between key control points; and a parent/child relationship of the key control points;
    identifying distances of the character that are indicative of typographical features of the character to be positioned on high contrast boundaries, the identifying distances being associated with at least some of the key control points; and
    positioning the identified key control points of the character to grid points on the grid that correspond to high contrast boundaries of pixel sub-components of the display device.

21. A method as defined in claim 20, wherein the distances include black distances which are interior to the outline of the character, white distances that are exterior to the outline of the character and grey distances which are a combination of black and white distances.

22. A method as defined in claim 20, wherein the distances define a stem width identified by the at least some of the key control points.

23. A method as defined in claim 22, further comprising the step of positioning the stems of the character.

24. A method as defined in claim 20, wherein the high contrast boundary is between blue pixel sub-components and green pixel sub-components, the blue pixel sub-components being interior to the character and the green pixel sub-components being exterior to the character.

25. A method as defined in claim 20, wherein the high contrast boundary is between red pixel sub-components and green sub-components, the red pixel sub-components being exterior to the character and the green pixel sub-components being interior to the character.

26. A method as defined in claim 20, further comprising the act of positioning the left character edge on the boundaries.

27. A method as defined by claim 1, the step for hinting the image data comprising the acts of:
    deriving a parent/child hierarchy representative of certain ones of said selected control points from the image data;
    examining the image data for patterns that indicate typographical features, wherein the patterns are identified by the certain ones of said selected control points and each node of the hierarchy is associated with one of the typographical features; and
    while traversing a data structure representing the hierarchy, phase adjusting one or more selected typographical features by positioning the certain ones of said selected control points associated with the selected typographical features on grid points of the grid that correspond to a high contrast boundary between pixel sub-components, the high contrast boundary not being a boundary between pixels.

28. A method as defined in claim 27, further comprising, as successive typographical features are phase adjusted, the act of accounting for an error introduced from phase adjusting the previous typographical feature.

29. A method as defined in claim 28, wherein the error is equal to the displacement of the previous typographical feature.

30. A method as defined in claim 27, wherein the pixel sub-components of the pixels are arranged on the display device to form vertical stripes of same-colored pixel sub-components and wherein the one or more selected typographical features include a vertical stem of the character.

31. A method as defined in claim 27, wherein the pixel sub-components of the pixels are arranged on the display device to form horizontal stripes of same-colored pixel subcomponents and wherein the one or more selected typographical features include a horizontal segment of the character.

32. A method as defined in claim 27, wherein the patterns include alternating black and white distances, wherein the black distances include dimensions that are interior to the character and the white distances include dimensions that are exterior to the character.

33. A method as defined in claim 27, wherein the patterns include alternating black and grey distances, wherein the black distances include dimensions that are interior to the character and wherein the grey distances include dimensions that are both interior and exterior to the character.

34. A computer program product for implementing, in a computer system having a display device for displaying an image, the display device having a plurality of pixels, each pixel including a plurality of pixel sub-components, a method for hinting the image data in preparation for displaying the image data on the display device, the computer program product comprising:
    a computer readable medium carrying computer executable instructions for implementing the method, the computer executable instructions, when executed, performing the acts of:
        grid fitting the image data to grid points of a grid that corresponds to the pixel and pixel sub-components of the display device such that one or more control points defining a typographical feature of the image data correspond to the grid points;
        phase adjusting the typographical feature such that the typographical feature coincides with a location of the grid that represents a boundary between pixel sub-components, the boundary being designated as a high contrast boundary due to the color contrast of the sub-pixel components which define the boundary, and which may comprise a boundary other than one which is between pixels; and interpolating the image data such that the position on the grid of remaining control points of the image data is adjusted.

35. A computer program product of claim 34, wherein the image data represents a character and, the method further comprising the acts of:
   identifying selected points of the image data by examining dimensions and distances stored and associated with the image data; and
   based on the examined dimensions and distances, recognizing the selected points as defined the typographical feature that is to be phase adjusted.

36. A computer program product as defined in claim 34, wherein the pixel sub-components are arranged on the display device to form vertical stripes of same-colored pixel sub-components, and wherein the typographical feature is a character stem that is parallel to the direction of the vertical stripes.

37. A computer program product as defined in claim 34, wherein the method further comprises the act of mapping spatially different sets of one or more samples to each of the pixel sub-components of a selected pixel, as opposed to mapping one or more samples to the entire selected pixel.

38. A computer program product as defined in claim 37, wherein the method further comprises the act of displaying the image on the display device based on the image data, resulting in the typographical feature being displayed at the high contrast boundary.

39. A computer program product as defined in claim 38, wherein the act of displaying the image on the display device comprises the act of separately controlling each of the pixel sub-components of the selected pixel by applying to the each of pixel sub-components of the selected pixel a luminance intensity value generated from the spatially different set of one or more samples mapped to the particular pixel sub-component.

40. A computer program product for implementing, in a computer system having a display device for displaying an image, the display device having a plurality of pixels, each pixel including a plurality of pixel sub-components, a method for hinting the image data in preparation for displaying the image data on the display device, the computer program product comprising:
   a computer readable medium carrying computer executable instructions for implementing the method, the computer executable instructions, when executed, performing the steps for:
      obtaining image data having selected control points with positions relative to the grid, the positions of at least one of the selected control points of the obtained image data not coinciding with a boundary between pixel sub-components;
      hinting the image data such that a typographical feature defined by one or more of the selected control points is adjusted to a position on the grid that corresponds to a selected boundary between pixel sub-components, the selected boundary being designated as a high contrast boundary due to the color contrast of the sub-pixel components which define boundary other than a boundary between pixels; and
      displaying the image on the display device using the image data, the typographical feature being displayed at the high contrast boundary.

41. In computer system having a processor and a display device having a plurality of pixels for displaying image data, each pixel having a plurality of pixel sub-components, a method for hinting the image data, the method comprising the acts of:
   grid fitting the image data to grid points of a grid that correspond to the pixels and pixel sub-components of the display device such that one or more control points defining a typographical feature of the image data correspond to the grid points;
   phase adjusting the typographical feature such that the typographical feature coincides with a location of the grid that represents a boundary between pixel sub-components, the boundary being designated as a high contrast boundary, the act of phase adjusting comprising:
      analyzing hinting instructions associated with the image data for patterns that are indicative of the typographical feature;
      deriving, from the hinting instructions, a directed acyclic graph, wherein the topology of the typographical feature is at least partially defined by one or more nodes of the directed acyclic graph; and
      based on a traversal of the directed acyclic graph, identifying the position of the typographical feature and repositioning the typographical feature to the high contrast boundary; and
   interpolating the image data such that the position on the grid of remaining control points of the image data is adjusted.

42. A method as recited in claim 41, further comprising the acts of:
   traversing the directed acyclic graph; and
   encountering a node that corresponds to a point of the image data that is to be repositioned on the grid; and
   accounting for an error introduced be a repositioning of a point corresponding to a previous node of the directed acyclic graph.

43. A method as defined in claim 41, wherein the act of analyzing the hinting instructions further comprises the act of searching for a selected pattern of distances having specified colors associated with the typographical feature.

44. A method as defined in claim 43, wherein the selected pattern is a black distance surrounded by white distances.

45. A method as defined in claim 43, wherein the selected pattern is a black distance surrounded by grey distances.

46. A method as defined in claim 43, wherein the selected pattern is a black distance surrounded by distances that are not black.

* * * * *

UNITED STATES PATENT AND TRADEMARK OFFICE
CERTIFICATE OF CORRECTION

PATENT NO.    : 6,597,360 B1
DATED         : July 22, 2003
INVENTOR(S)   : Stamm et al.

It is certified that error appears in the above-identified patent and that said Letters Patent is hereby corrected as shown below:

Column 2,
Line 1, after "geometry of" please delete "a"
Line 3, after "computers, the" please delete "pixels" and insert -- pixel --
Line 47, before "when applied" please delete "process," and insert -- processes --

Column 3,
Line 65, after "character after" please delete "is" and insert -- it --

Column 9,
Line 53, "(e.g., each" please delete "samples" and insert -- sample --

Column 10,
Line 51, after "to make" please delete "an" and insert -- a --

Column 13,
Line 13, before "phase adjusted" please delete "by" and insert -- be --

Column 15,
Line 31, after "control points," please delete "distance" and insert -- distances --
Line 41, after "sub-components" please delete "of" and insert -- on --

Signed and Sealed this

Twenty-seventh Day of July, 2004

JON W. DUDAS
*Acting Director of the United States Patent and Trademark Office*